(12) United States Patent
Imai et al.

(10) Patent No.: US 8,245,749 B2
(45) Date of Patent: Aug. 21, 2012

(54) METHOD AND APPARATUS FOR MANUFACTURING A HEAD-GIMBAL ASSEMBLY

(75) Inventors: Hideto Imai, Kanagawa (JP); Tatsumi Tsuchiya, Kanagawa (JP); Eiki Oosawa, Kanagawa (JP); Naoki Suzuki, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 297 days.

(21) Appl. No.: 12/642,178

(22) Filed: Dec. 18, 2009

(65) Prior Publication Data

US 2010/0154989 A1    Jun. 24, 2010

(30) Foreign Application Priority Data

Dec. 18, 2008  (JP) .................................. 2008-321789

(51) Int. Cl.
*B29C 65/10* (2006.01)
*B32B 37/00* (2006.01)
*G11B 21/16* (2006.01)

(52) U.S. Cl. ................... 156/379.6; 156/497; 360/234.6

(58) Field of Classification Search ............... 156/379.7, 156/380.9, 497, 379.6; 360/234.6
See application file for complete search history.

(56) References Cited

U.S. PATENT DOCUMENTS

| | | | | |
|---|---|---|---|---|
| 4,352,723 A * | 10/1982 | Morgan | ............................ | 522/21 |
| 5,252,694 A * | 10/1993 | Willett et al. | ..................... | 522/13 |
| 5,462,797 A * | 10/1995 | Williams et al. | .............. | 428/345 |
| 6,007,664 A * | 12/1999 | Kuizenga et al. | ........... | 156/272.8 |
| 2003/0142444 A1* | 7/2003 | Tan et al. | .................... | 360/234.6 |
| 2008/0094754 A1* | 4/2008 | Makino et al. | .............. | 360/234.6 |

* cited by examiner

*Primary Examiner* — Katarzyna Wyrozebski Lee
*Assistant Examiner* — Scott W Dodds

(57) ABSTRACT

A method for manufacturing a head-gimbal assembly. The head-gimbal assembly includes a head-slider bonded to a suspension. The method includes placing the head-slider and the suspension in a superposed manner with a photo-thermosetting adhesive applied between the head-slider and the suspension. The method also includes heating the suspension from a side of the suspension opposite to a side of the suspension in contact with the photo-thermosetting adhesive with a heated gas-stream. In addition, the method includes irradiating the photo-thermosetting adhesive with light at least partly in a time period during which the suspension is heated by the gas-stream.

4 Claims, 6 Drawing Sheets

| | Ultraviolet irradiation (sec.) | Blowing of high-temperature gas (sec) | Heating of chamber (min.) | Average polymerization degree (%) | Variation in polymerization degree | Average bond strength (gf) |
|---|---|---|---|---|---|---|
| First embodiment | Ultraviolet rays & high-temperature nitrogen gas | 2 | 2 | – | 95 | 4 | 160.3 |
| Second embodiment | Ultraviolet rays & high-temperature nitrogen gas | 2 | 5 | – | 99 | 1 | 167.6 |
| Third embodiment | Ultraviolet rays & high-temperature nitrogen gas | 2 | 10 | – | 100 | 4 | 171 |
| First comparative example | Ultraviolet rays → Heating of chamber | 2 | – | 60 | 91 | 9 | 150.6 |
| Second comparative example | Ultraviolet rays ↘ High-temperature nitrogen gas | 2 | 2 | – | 94 | 10 | 146.6 |
| Third comparative example | Ultraviolet rays only | 2 | – | – | 94 | 7 | 75.3 |
| Fourth comparative example | Heating of chamber only | – | – | 60 | 78 | 8 | 67.6 |
| Fifth comparative example | High-temperature nitrogen gas only | – | 2 | – | 84 | 2 | 80.3 |
| Sixth comparative example | High-temperature air only | – | 2 | – | 80 | 2 | 78.6 |

FIG. 5

| Blowing angle (deg.) | Average bond strength (gf) |
|---|---|
| 8 | 115.8 |
| 12 | 117.2 |
| 16 | 134.2 |
| 20 | 162.4 |
| 24 | 142.6 |
| 28 | 132.2 |

FIG. 6

METHOD AND APPARATUS FOR MANUFACTURING A HEAD-GIMBAL ASSEMBLY

CROSS-REFERENCE TO RELATED APPLICATION

This application claims priority from the Japanese Patent Application No. 2008-321789, filed Dec. 18, 2008, the disclosure of which is incorporated herein in its entirety by reference.

TECHNICAL FIELD

Embodiments of the present invention relate to a method and apparatus for manufacturing a head-gimbal assembly (HGA).

BACKGROUND

A HGA used for a hard-disk drive (HDD) is manufactured by bonding a head-slider, including a magnetic-recording head, and a suspension supporting the head-slider to each other.

As is known in the art, a technique for bonding such a head-slider and a suspension utilizes a photo-thermosetting adhesive. Specifically, a photo-thermosetting adhesive applied between the head-slider and the suspension is temporarily hardened when irradiated with light such as ultraviolet light; and, subsequently, the photo-thermosetting adhesive is hardened when heated in a high-temperature chamber.

Engineers and scientists engaged in HDD manufacturing and development are interested in lowering the cost of manufacturing HDDs associated with the manufacture of HGAs to meet the rising demands of the marketplace for HDDs at reduced price, while maintaining increased performance, and reliability.

SUMMARY

Embodiments of the present invention include a method for manufacturing a head-gimbal assembly. The head-gimbal assembly includes a head-slider bonded to a suspension. The method includes placing the head-slider and the suspension in a superposed manner with a photo-thermosetting adhesive applied between the head-slider and the suspension. The method also includes heating the suspension from a side of the suspension opposite to a side of the suspension in contact with the photo-thermosetting adhesive with a heated gas-stream. In addition, the method includes irradiating the photo-thermosetting adhesive with light at least partly in a time period during which the suspension is heated by the gas-stream.

DESCRIPTION OF THE DRAWINGS

The accompanying drawings, which are incorporated in and form a part of this specification, illustrate embodiments of the invention and, together with the description, serve to explain the embodiments of the present invention:

FIG. 5 is a table showing characteristics of embodiments of the present invention and comparative examples.

FIG. 6 is a table showing a relation between the blowing angle and the average bond strength, in accordance with an embodiment of the present invention.

Figure 1:
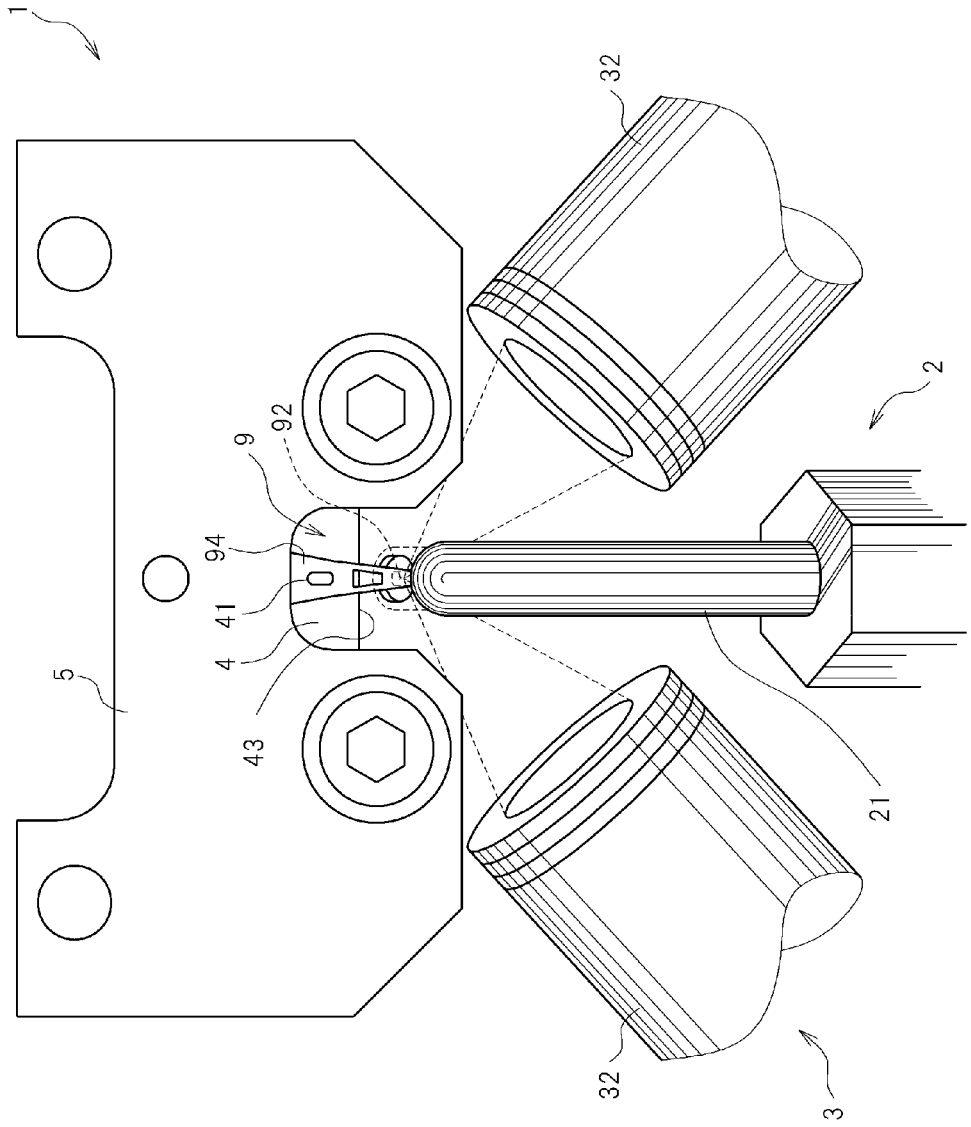
FIG. 1 is a plan view of a head-gimbal-assembly (HGA) manufacturing apparatus, in accordance with a first embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

DESCRIPTION OF EMBODIMENTS OF THE PRESENT INVENTION FOR A METHOD AND APPARATUS FOR MANUFACTURING A HEAD-GIMBAL ASSEMBLY

In accordance with embodiments of the present invention, the inventors have studied irradiation with light and heating simultaneously in order to reduce the time necessary to bond the head-slider with the suspension. However, since the adhesive applied between the head-slider and the suspension is usually heated from the head-slider side of the head-gimbal assembly (HGA), an issue arises that the air-bearing surface (ABS) of the head-slider, as well as, other portions of head-slider is prone to be distorted.

Embodiments of the present invention have been devised in view of the above-described situation. Embodiments of the present invention provide a method and apparatus for manufacturing a head-gimbal assembly (HGA) in order to reduce the time to bond the head-slider and the suspension while preventing distortion of the head-slider.

In order to address the above-described issue, embodiments of the present invention provide a method for manufacturing a HGA that includes a head-slider bonded to a suspension, which supports the head-slider. In accordance with embodiments of the present invention, the method includes: placing the head-slider and the suspension in a superposed manner, with a photo-thermosetting adhesive being applied between the head-slider and the suspension; heating the suspension from the side of the suspension opposite to a side of the suspension in contact with the photo-thermosetting adhesive with a heated gas-stream; and, irradiating the photo-thermosetting adhesive with light at least partly in the time period during which the suspension is heated by the gas-stream.

In one embodiment of the present invention, heating of the suspension is started before irradiating the photo-thermosetting adhesive with light.

In another embodiment of the present invention, the method further includes heating the suspension from the side of the suspension in contact with the photo-thermosetting adhesive, such that gas is blown onto the side of the suspension in contact with the photo-thermosetting adhesive.

In another embodiment of the present invention, the gas may be an inert gas.

In another embodiment of the present invention, a wall portion may be disposed downstream of the head-slider and the suspension along the gas-stream of the gas, such that the wall portion deflects the gas-stream of the gas back towards the head-slider and the suspension.

In another embodiment of the present invention, the blowing angle of the gas-stream with respect to the wall portion may be 14 to 24 degrees.

In another embodiment of the present invention, an infrared laser irradiates the suspension from the side of the suspension in contact with the photo-thermosetting adhesive.

Moreover, embodiments of the present invention provide an apparatus for manufacturing a HGA that includes a head-slider bonded to a suspension, which supports the head-slider. In accordance with embodiments of the present invention, the apparatus includes: a heater configured to heat the suspension of a superposed element from a side of the suspension opposite to a side of the suspension in contact with a photo-thermosetting adhesive, such that the superposed element is formed by placing the head-slider and the suspension in a superposed manner, with the photo-thermosetting adhesive being applied between the head-slider and the suspension; and, an irradiation unit for irradiating the photo-thermosetting adhesive with light at least partly in a time period during which the suspension is heated by the heater.

In one embodiment of the present invention, the heater further includes a blower for blowing heated gas in a gas-stream onto the head-slider side of the superposed element.

In another embodiment of the present invention, the apparatus further includes a wall portion disposed to lie downstream of the superposed element along the gas-stream of the gas.

In another embodiment of the present invention, the heater is configured to blow gas onto the superposed element from the suspension side of the superposed element; and, the irradiation unit is configured to irradiate the superposed element with light directed towards the head-slider side of the superposed element.

In another embodiment of the present invention, the irradiation unit further includes two irradiators separated in a width direction of the head-slider; and, the heater further comprises a blower for blowing heated gas onto a head-slider side of the superposed element such that the blower is disposed between the two irradiators.

In accordance with embodiments of the present invention, since the suspension is heated from the side of the suspension opposite to a side of the suspension in contact with the photo-thermosetting adhesive, heat is quickly transferred to the photo-thermosetting adhesive and a temperature rise of the head-slider is restrained in comparison with a case where the head-slider side is heated. Therefore, it becomes possible to reduce the time necessary to bond the head-slider with the suspension while preventing distortion of the head-slider.

Figure 2:
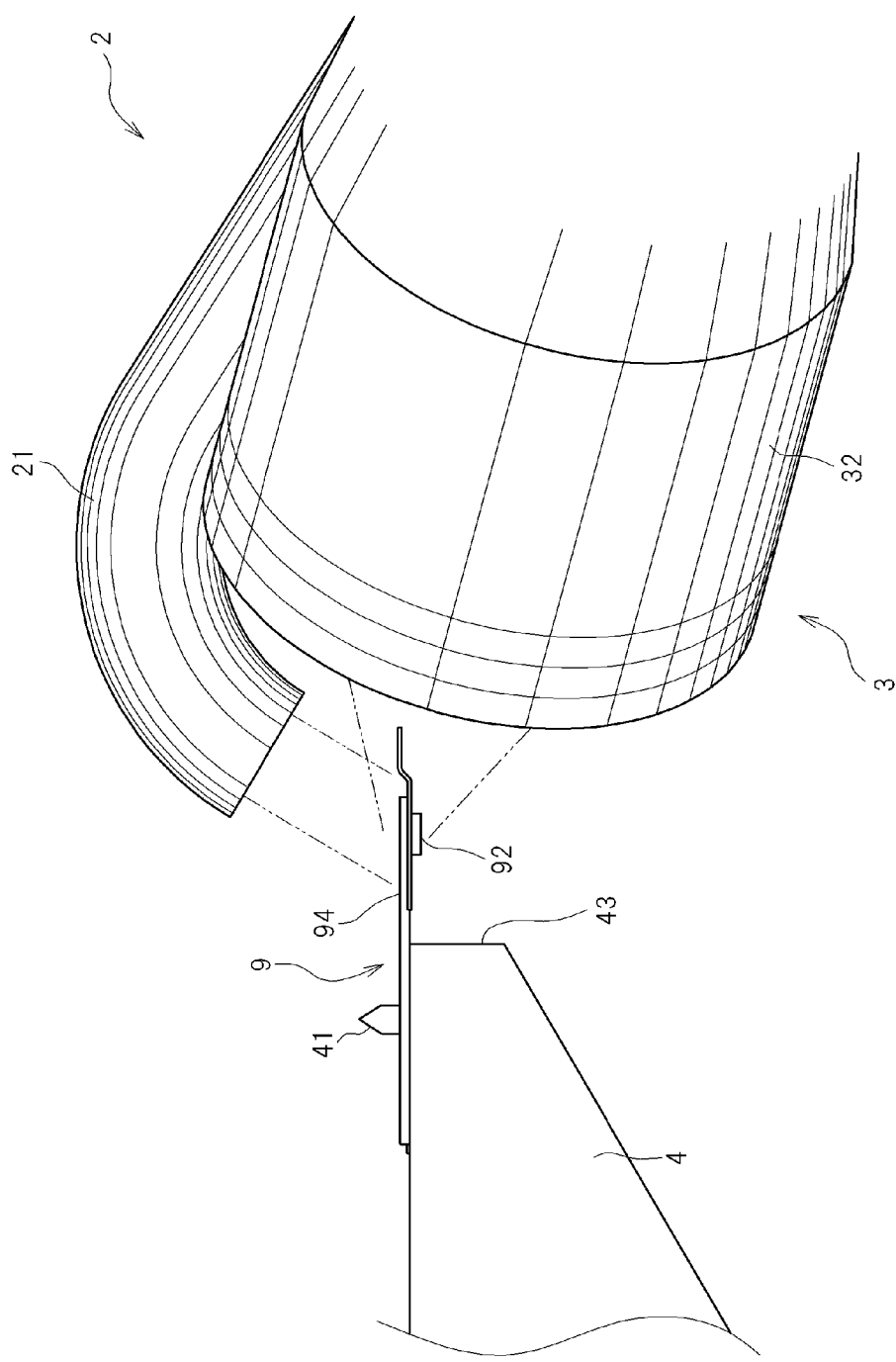
FIG. 2 is a side view of the HGA manufacturing apparatus, in accordance with a first embodiment of the present invention.
Figure 3:
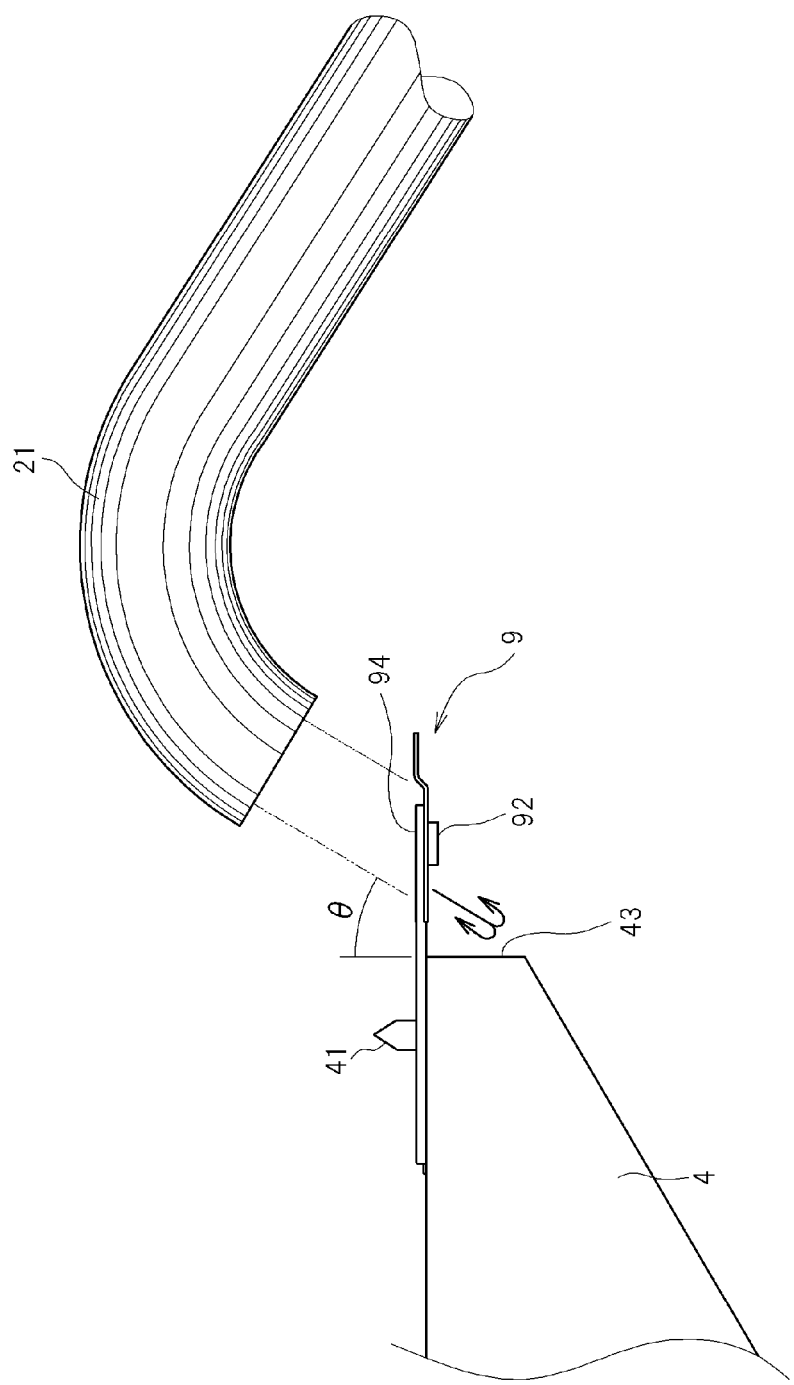
FIG. 3 is a diagram showing the HGA manufacturing apparatus, in accordance with a first embodiment of the present invention.

With reference now to FIG. 1, in accordance with an embodiment of the present invention, a plan view is shown of a HGA manufacturing apparatus 1. FIGS. 2 and 3 are side views of the HGA manufacturing apparatus 1. In FIGS. 2 and 3, a roof portion 5 shown in FIG. 1 is omitted from the views shown in FIGS. 2 and 3 for purposes of clarity of description. In FIG. 3, irradiators 32 are also omitted for purposes of clarity of description.

The HGA manufacturing apparatus 1 is used to manufacture a HGA used for hard-disk drives (HDDs). Here, the HGA includes a head-slider 92 configured to fly in proximity with a recording surface of a magnetic-recording disk to read data from, and to write data to, the magnetic-recording disk, and a metal suspension 94, which supports the head-slider, the head-slider 92 and the metal suspension 94 being bonded to each other.

The HGA manufacturing apparatus 1 includes a supporting platform 4 which supports a superposed element 9 which becomes the HGA. The superposed element 9 is formed by placing the head-slider 92 and the suspension 94 in a superposed manner with an ultraviolet-ray thermosetting adhesive being applied between the head-slider and the suspension. The HGA manufacturing apparatus 1 further includes a heater 2 that blows high-temperature gas in a gas-stream directed onto the superposed element 9; and, an irradiation unit 3 that irradiates the superposed element 9 with ultraviolet rays.

The ultraviolet-ray thermosetting adhesive is an example of photo-thermosetting adhesive which is hardened when irradiated with ultraviolet rays and heated. As an ultraviolet-ray thermosetting adhesive, products known in the art may be used.

The supporting platform 4 has a projection 41 on the top surface of a leading end. The projection 41 is inserted into a hole disposed on the base end side of the suspension 94. The leading end of the suspension 94 protrudes from the wall portion 43 of the leading end of the supporting platform 4. The head-slider 92 is attached to the undersurface at a leading end of the suspension 94.

The supporting platform 4 is configured so as to move between an upper and lower end positions. At the upper limit position, the superposed element 9 is irradiated with ultraviolet rays and subjected to blowing of high-temperature gas in a directed gas-stream, as shown in FIGS. 1 to 3. On the other hand, at the lower end position, the superposed element 9 is attached to the supporting platform 4 which is raised by a lifter (not shown).

The heater 2 includes a blower 21 having a nozzle shape. The blower 21 blows high-temperature gas in a gas-stream directed onto the superposed element 9. The blower 21 is disposed on the side opposite to the wall portion 43 of the supporting platform 4 so as to blow high-temperature gas in a gas-stream from above the superposed element 9 toward the top surface of the suspension 94. In one embodiment of the present invention, a range over which high-temperature gas is to be blown includes a portion equivalent to the backside of the ultraviolet-ray thermosetting adhesive on the top surface of the suspension 94.

Although an inert gas such as nitrogen is suitably used as the high-temperature gas, air may be used. Furthermore, in another embodiment of the present invention, the high-temperature gas is heated, for example, to around 110 to 150° C. Within this temperature range, the ultraviolet-ray thermosetting adhesive is hardened sufficiently; and, the suspension 94 is hardly thermally affected.

The wall portion 43 of the supporting platform 4 is disposed to lie downstream of the superposed element 9 along the path of the gas-stream composed of the high-temperature gas. As shown in FIG. 3, a portion of the gas-stream of the high-temperature gas that has passed through the superposed element 9 is deflected back by the wall portion 43, and then flows toward the vicinity of the junction of the head-slider 92 and the suspension 94. In another embodiment of the present invention, the blowing angle θ of the gas-stream of the high-temperature gas with respect to the wall portion 43 is 14 to 24 degrees.

The heater 2 is not limited to the blower 21, but may be any apparatus that can locally heat the suspension 94, for example, an infrared laser irradiation apparatus.

The irradiation unit 3 includes two irradiators 32 disposed on both sides of the blower 21 on the side opposite to the wall portion 43 of the supporting platform 4. These irradiators 32 radiate ultraviolet rays from slightly below the superposed element 9 toward the ultraviolet-ray thermosetting adhesive applied between the head-slider 92 and the suspension 94.

Figure 4:
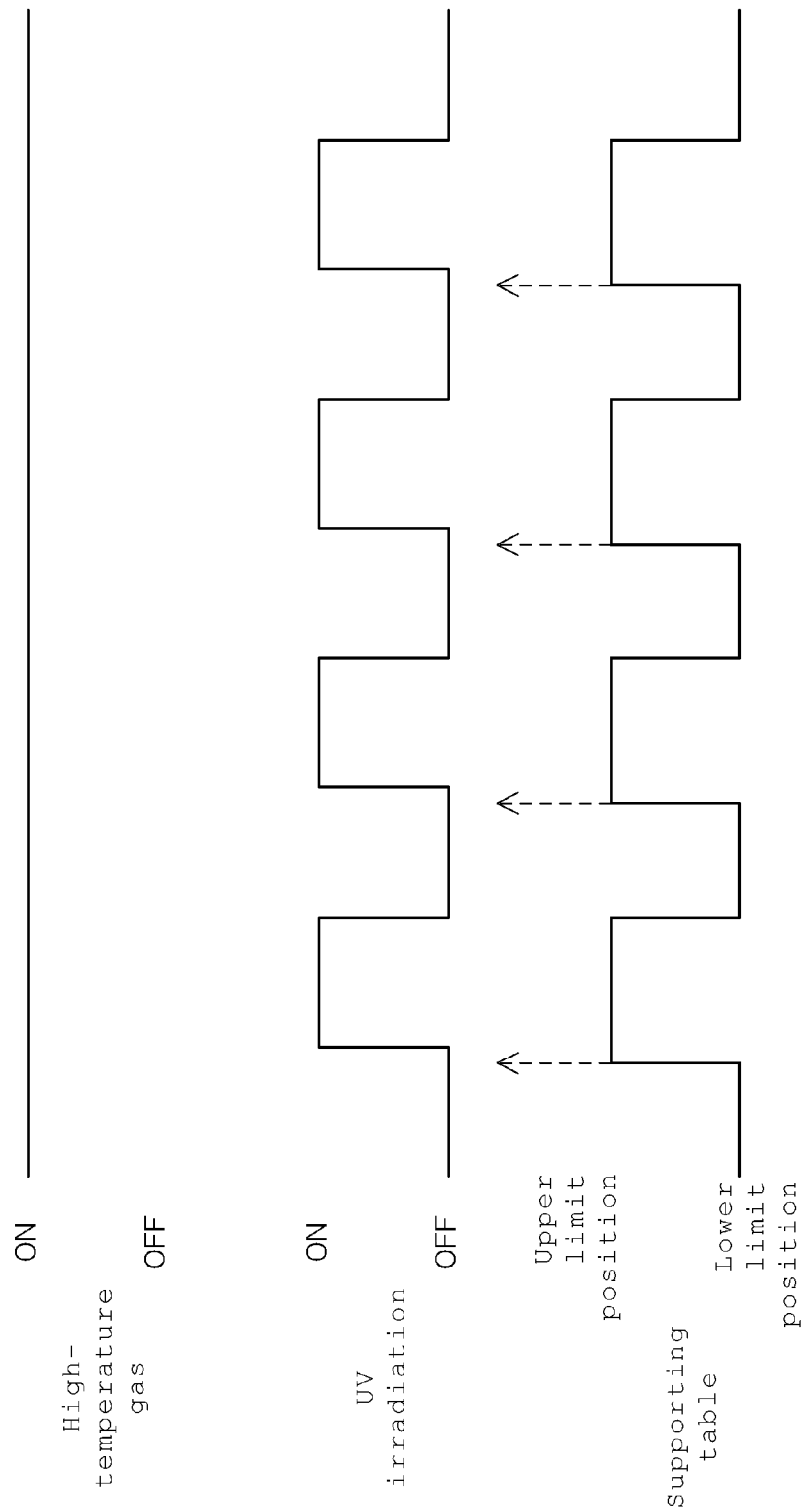
FIG. 4 is a timing chart that shows timing for heating and irradiation of a head-slider and a suspension in manufacturing the HGA, in accordance with an embodiment of the present invention.

With reference now to FIG. 4, in accordance with an embodiment of the present invention, a timing chart is shown that shows the timing for heating and irradiation with light of a head-slider and a suspension of the superposed element 9 in manufacturing the HGA. As shown in FIG. 4, blowing of the high-temperature gas begins before starting ultraviolet irradiation. In particular, ultraviolet light rays intermittently irradiate the superposed element 9, in accord with the timing chart, when the supporting platform 4 is elevated to the upper limit position while the high-temperature gas is continuously blown in a gas-stream directed towards the superposed element 9.

In accordance with embodiments of the present embodiment, since the blower 21 blows high-temperature gas in a gas-stream directed onto the top surface of the suspension 94, heat is quickly transferred to the ultraviolet-ray thermosetting adhesive restraining temperature rise of the upper portion of the head-slider 92 that includes the ABS. Therefore, it is possible to reduce the time necessary to bond the head-slider 92 and the suspension 94 while preventing distortion of the head-slider 92.

In accordance with embodiments of the present invention shown in FIG. 3, since a portion of the high-temperature gas that has passed through the superposed element 9 is deflected back by the wall portion 43, the surround of the junction between the head-slider 92 and the suspension 94 is likely to be at high temperature and in a nitrogen atmosphere.

In accordance with the embodiment of the present invention shown in FIG. 4, since blowing of the high-temperature gas is started before beginning ultraviolet irradiation, the surround of the junction of the head-slider 92 and the suspension 94 is likely to be at high temperature and in a nitrogen atmosphere before ultraviolet irradiation begins.

In accordance with an embodiment of the present invention shown in FIG. 1, since the blower 21 is disposed between the two irradiators 32, the two irradiators 32 are placed in a compact space such that two irradiators 32 are close to the superposed element 9

With reference now to FIG. 5, in accordance with embodiments of the present invention, a table is shown that shows characteristics of embodiments of the present invention and comparative examples. FIG. 5 shows the results of a test performed to ascertain the effectiveness of embodiments of the present invention, which is next described. With the first to third embodiments, as described above, the superposed element 9 is irradiated with ultraviolet rays and subjected to blowing of high-temperature gas simultaneously. The high-temperature gas is blown for 2 seconds, 5 seconds, and 10 seconds, respectively; meanwhile, ultraviolet rays are radiated for 2 seconds. Nitrogen at 120-degree temperature is used as the high-temperature gas.

With a first comparative example, the superposed element 9 is irradiated with ultraviolet rays for 2 seconds and then heated in a high-temperature chamber for 60 minutes. With a second comparative example, the superposed element 9 is irradiated with ultraviolet rays for 2 seconds and then subjected to blowing of high-temperature gas for 2 seconds.

With a third comparative example, the superposed element 9 is irradiated with ultraviolet rays for 2 seconds. In a fourth comparative example, the superposed element 9 is heated in the high-temperature chamber for 60 minutes.

With fifth and sixth comparative examples, the superposed element 9 is subjected to blowing of high-temperature gas for 2 seconds. Either nitrogen or air is used as the high-temperature gas.

With each of the thus-obtained embodiments and comparative examples, the polymerization degree of the ultraviolet-ray thermosetting adhesive was measured; and, an average was obtained. With each of the embodiments and comparative examples, the average polymerization degree is represented as a ratio to the value in the third embodiment, the value in the third embodiment being normalized to a value of 100. In addition, the difference between the maximum and minimum measured values of the polymerization degree was obtained as variation in the polymerization degree. Moreover, the bond strength of the ultraviolet-ray thermosetting adhesive was also measured; and, an average was obtained.

For each of the embodiments and comparative examples, FIG. 5 shows: the average polymerization degree, variation in polymerization degree, and average bond strength. As clearly demonstrated by these results, the first to third embodiments obtained better results than the first to sixth comparative examples. Furthermore, as clearly demonstrated by the fifth and sixth comparative examples, the use of nitrogen appeared to be somewhat better than the use of air as a high-temperature gas.

With reference now to FIG. 6, in accordance with embodiments of the present invention, a table is shown that shows a relationship between the blowing angle and the average bond strength. For each of the embodiments having a different blowing angle θ of the high-temperature gas with respect to the wall portion 43 (refer to FIG. 3), the bond strength of the ultraviolet-ray thermosetting adhesive was measured; and, the average was obtained. As a result, in accordance with embodiments of the present invention, suitably large bond strengths were found for a blowing angle between 12 to 24 degrees.

While embodiments of the present invention have been described based on specific examples, embodiments of the present invention are not limited to the above-described examples; rather, numerous modifications and variations of embodiments of the present invention are possible within the spirit and scope of embodiments of the present invention.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for manufacturing a head-gimbal assembly that includes a head-slider bonded to a suspension, said apparatus comprising:
    a heater configured to heat said suspension of a superposed element from a side of said suspension opposite to a side of said suspension in contact with a photo-thermosetting adhesive, said heater comprising a blower having a nozzle shape and configured to blow heated gas in a gas-stream onto said superposed element, said superposed element being formed by placing said head-slider and said suspension in a superposed manner, with said photo-thermosetting adhesive being applied between said head-slider and said suspension;
    an irradiation unit for irradiating said photo-thermosetting adhesive with light at least partly in a time period during which said suspension is heated by said heater; and
    a wall portion disposed to lie downstream of said superposed element along said gas-stream of said gas, said wall portion configured to deflect said gas-stream of said gas back towards said superposed element onto a head-slider side of said superposed element.

2. The apparatus of claim 1,
    wherein said blower having a nozzle shape is configured to blow said gas-stream at a blowing angle with respect to said wall portion that is 14 to 24 degrees.

3. The apparatus of claim 1, wherein said heater is configured to blow gas onto said superposed element from a suspension side of said superposed element; and,
    wherein said irradiation unit is configured to irradiate said superposed element with light directed towards said head-slider side of said superposed element.

4. The apparatus of claim 1, wherein said irradiation unit further comprises:
    two irradiators separated in a width direction of said head-slider; and wherein said heater further comprises:
    said blower configured to blow heated gas onto said head-slider side of said superposed element, and
    wherein said blower is disposed between said two irradiators.

* * * * *